United States Patent [19]

Fletcher et al.

[11] 4,107,155
[45] Aug. 15, 1978

[54] POLYSULFONAMIDES

[75] Inventors: George Leland Fletcher, Pittsford; Stewart H. Merrill, Rochester, both of N.Y.

[73] Assignee: Eastman Kodak Company, Rochester, N.Y.

[21] Appl. No.: 811,417

[22] Filed: Jun. 29, 1977

[51] Int. Cl.$^2$ .............................................. C08G 75/30
[52] U.S. Cl. ..................................... 528/373; 528/392; 528/422; 528/423
[58] Field of Search .................. 260/79.3 M, 79.3 MU

[56] References Cited

U.S. PATENT DOCUMENTS

| | | |
|---|---|---|
| 3,574,739 | 4/1971 | Wei et al. ..................... 260/556 AR |
| 3,776,890 | 12/1973 | Lee ..................................... 260/78 R |
| 4,032,344 | 6/1977 | Fletcher et al. .................. 96/48 HD |

FOREIGN PATENT DOCUMENTS

| | | |
|---|---|---|
| 837,658 | 1/1976 | Belgium. |
| 896,604 | 3/1972 | Canada. |
| 1,335,095 | 10/1973 | United Kingdom. |

*Primary Examiner*—Ronald W. Griffin
*Attorney, Agent, or Firm*—Dana M. Schmidt

[57] ABSTRACT

A polymer is disclosed having repeating units with the structures

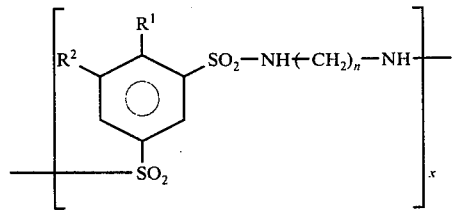

and

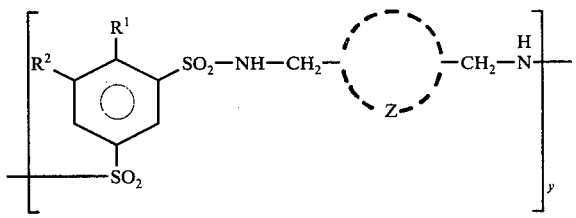

wherein
$R^1$ and $R^2$ are the same or different, and are each hydrogen, halogen or alkyl from 1 to about 3 carbon atoms,
$n$ is 2 or 3,
$x$ and $y$ are mole percentage amounts of the respective repeating units,
$x$ ranging from 0 to about 90% and $y$ being at least 10%, and
Z represents the atoms necessary to form a saturated or unsaturated carbocyclic ring having from about 5 to about 7 carbon ring atoms.

10 Claims, No Drawings

POLYSULFONAMIDES

FIELD OF THE INVENTION

This invention relates to sulfonamide copolymers found to have unusual retentive ability for highly volatile compounds such as phthalaldehyde.

BACKGROUND OF THE INVENTION

Polysulfonamides have been described in the literature as copolymers condensable from diamines and aromatic disulphonic acids. For example, British Pat. Specification No. 1,335,095 discloses a copolymer having the structure

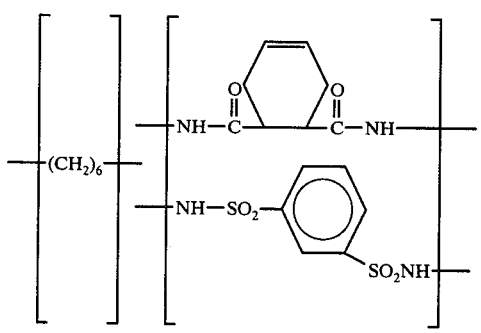

useful in combination with sensitizers to form photoresists.

Sulfonamide compounds have also been disclosed for their pharmacological activity, such as the alkoxybenzenesulfonamide compounds of U.S. Pat. No. 3,574,739. However, this patent does not disclose these compounds as being useful in polymer form.

Polyamides of varying structural units have been disclosed as useful for film formation. For example, U.S. Pat. No. 3,776,890 discloses solution polymerization of a monomer having the chemical structure

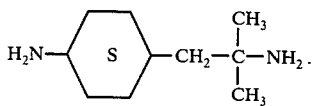

Another patent relating to the background of polyamides in general is Canadian Pat. No. 896,604.

RELATED APPLICATIONS

At least one copolymer of the type herein claimed is described but not claimed per se in commonly-owned U.S. Applications Ser. No. 645,178, now U.S. Pat. No. 4,032,344, filed on Dec. 29, 1975 and on May 23, 1977 by G. Fletcher et al, entitled "Polysulfonamide Vesicular Binders" and "Heat Sensitive Dye Layers" respectively, as binders for a vesicularimaging layer and for an antihalation layer, respectively. Belgian Pat. No. 837,658 granted on July 16, 1976 corresponds to said Ser. No. 645,178.

SUMMARY OF THE INVENTION

As an object and advantage of this invention, there is provided a novel polymer having particular utility as a film capable of retaining highly volatile compounds admixed therewith.

More specifically, there is provided a polymer having superior retention of phthalaldehyde, comprising repeating units having the structures

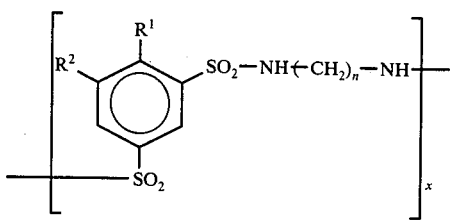

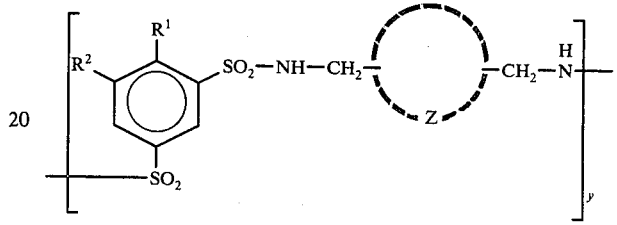

wherein $R^1$ and $R^2$ are the same or different, and are each hydrogen, halogen or alkyl from 1 to about 3 carbon atoms, such as methyl, ethyl, propyl, isopropyl and the like;

$n$ is 2 or 3, $x$ and $y$ are mole percentage amounts of the respective repeating units, $x$ ranging from 0 to about 90% and $y$ being at least 10%, and Z represents the atoms necessary to form a saturated or unsaturated ring having from about 5 to about 7 carbon ring atoms.

DESCRIPTION OF THE PREFERRED EMBODIMENTS

Although the polymer hereinafter described has particular utility as a binder for the retention of phthalaldehyde used in an imaging composition, it is not so limited. For example, it is also useful as a binder for a vesiculating agent, as described in the aforesaid application Ser. No. 645,178, and as a binder for a ketyl-releasing compound which acts as a reducing agent for a dye in an antihalation layer, as described in the aforesaid application Ser. No. 799,797.

The polymers of this invention provide exceptional retention of phthalaldehyde, a highly volatile compound. Such retention is particularly desired of binders for a coated element wherein an amine-releasing compound is photoactivated to imagewise release an amine which polymerizes phthalaldehyde to form a dense image. Such imagewise polymerization is described and claimed in commonly-owned U.S. Application Ser. No. 720,873 filed on Sept. 7, 1976 by A. Adin et al entitled "Transition Metal Photoreduction Systems and Processes," and in Research Disclosure, Vol. 158, June 1977, Publication No. 15874, published by Industrial Opportunities Limited, Homewell, Havant Hampshire P091EF United Kingdom, the details of which are hereby incorporated herein by reference.

Although the exact mechanism by which this property of phthalaldehyde retention is achieved is not understood, it is not necessary to the practice of the invention. However, it is believed the mechanism features a rigidized polymer chain provided by the monomers of the polymer. It is theorized that such rigidity inhibits volatile diffusants from diffusing out of coatings made from such binders. Such rigidity can be estimated from the polymers' glass transition temperatures (Tg), in that for the polymers of the invention, Tg's above 115° C are more likely to represent the desired rigidity. The best measure, however, is of the weight percent phthalaldehyde lost when a test element is prepared by coating phthalaldehyde admixed with the binder candidate, and heating the dried element for a prescribed arbitrary time. Examples of such tests are set forth hereinafter. Those binders that produce phthalaldehyde losses of less than about 15%, under these conditions, are considered to be superior.

Highly useful representative examples of polymers of this invention include poly(ethylene-co-1,4-cyclohexylenedimethylene-1-methyl-2,4-benzenedisulfonamide); poly(ethyleneco-1,4-cyclohexylenedimethylene-1-chloro-2,4-benzene-disulfonamide); poly(ethylene-co-1,4-cyclohexylenedimethylene-1,2-dichloro-3,5-benzenedisulfonamide); poly(ethylene-co-1,4-cyclohexylenedimethylene-1-chloro-3,5-benzenedisulfonamide); poly(1,3-xylylene-1-methyl-2,4-benzenedisulfonamide); poly(trimethylene-co-1,4-cyclohexylenedimethylene-1-methyl-2,4-benzenedisulfonamide); poly(1,4-cyclohexylenedimethylene-1-methyl-2,4-benzenedisulfonamide); poly(1,4-xylylene-1-methyl-2,4-benzenedisulfonamide); and poly(ethylene-co-1,3-xylylene-1-methyl-2,4-benzenedisulfonamide). Of these, a currently preferred embodiment for phthalaldehyde retention is poly(ethylene-co-1,4-cyclohexylenedimethylene-1-methyl-2,4-benzenedisulfonamide).

Although the structure of formula I and the names of the previous paragraph represent presently preferred embodiments of the invention, it should be understood that a variety of equivalent aromatic disulfonyl structures are also contemplated as being within the scope of the present invention, such as those having different or more $R^1$ and $R^2$ substituents than those named, provided they produce phthalaldehyde losses of less than about 15% when tested as described.

In addition to the repeating units noted above as structures (I), other repeating units arising from the use of up to about 25 mole percent of noninterfering monomers, can be incorporated.

The polymers of this invention can be prepared by polycondensing in solution the appropriate diamines and aromatic disulfonyl chloride, or by any other suitable polymerization techniques. Two specific methods are highly preferred, and these are as follows:

Method A

A flask equipped with power stirrer, reflux condenser, and dropping funnel is charged with diamine, calcium hydroxide and tetrahydrofuran(THF). The mixture is heated to boiling on a steam bath after which the steam bath is removed and a solution of the disulfonyl chloride in THF is added to the vigorously stirred mixture as rapidly as the condenser accommodates the exothermal reaction (2–3 min). The thick suspension is stirred and heated on a steam bath for an additional hour, then cooled to room temperature. Acetone is added and after stirring for 30 minutes the suspension is suction filtered through appropriate filter paper. The clear solution is precipitated into ten times its volume of water with vigorous stirring, then soaked in fresh water overnight. The fibrous polymer is air dried for 24 hours, then vacuum dried at 45° C to constant weight.

Method B

A flask equipped with power stirrer, dropping funnel, and thermometer is charged with diamine, calcium hydroxide and THF. A solution of the disulfonyl chloride in THF is added dropwise to the stirred suspension during one hour while maintaining the temperature of the reaction mixture at 20°–30° C with the aid of an ice bath. The reaction is continued for an additional 24 hours whereupon the viscous mixture is diluted with THF. The suspension is suction filtered through filter paper and acetic anhydride is added to the filtrate and the solution stirred at room temperature for 24 hours. The polymer solution is precipitated in water and treatment is completed as in Method A.

Therefore, a specific preparation of poly(ethylene-co-1,4-cyclohexylenedimethylene-1-methyl-2,4-benzenedisulfonamide) can proceed by Method B as follows: A 2 liter flask of the type described above is charged with 0.21 moles each of 1,4-cyclohexanebis(methylamine) and ethylenediamine, 0.8 moles of calcium hydroxide and 300 ml of tetrahydrofuran(THF). A solution of 0.4 moles of 1-methyl-2,4-benzene disulfonyl chloride in 200 ml of THF is added dropwise for one hour to the stirred suspension of diamine while maintaining a reaction temperature between 20° and 30° C. The reaction is allowed to continue for 24 hours, after which the viscous mixture is diluted to 1600 ml by adding THF. The suspension is then filtered as described above and excess acetic anhydride is added to the filtrate solution followed by stirring at room temperature for 24 hours. Precipitation of the polymer and drying proceeds as described above.

In condensation polymerization, the molar amounts of the diamines will of course depend upon the mole ratio desired. Typically, the mole ratios of the diamine monomers fall within the following range:

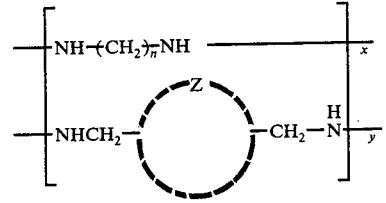

wherein
 $x$ is from 0 to 90% of the diamines,
 $y$ is from 100 to 10% of the diamines, and $n$ is as defined above.

Within this range, highly preferred values of $x$ are from 20 to about 80%, with $y$ equal to 100 minus $x$ percent.

It has been found that the polymers of the invention are readily soluble, at 10% weight concentration, in 2-methoxyethanol, 2-ethoxyethanol, tetrahydrofuran, dimethylformamide, acetone, dimethylsulfoxide, methyl ethyl ketone, 2N sodium hydroxide, cyclohexanone, and mixtures of these. They tend to be insoluble in alkanols, diols, water 14N $NH_4OH$, benzene, toluene, trichloroethanes, and the like.

The molecular weights of these polymers do not appear to be critical. A wide range is possible, as demonstrated by inherent viscosities ranging from about 0.3 to about 1.5. All inherent viscosities herein referred to were measured as 0.25 weight percent solutions in dimethylformamide.

As mentioned above, a highly useful form of the polymer is as a binder for a composition formed by coating from a solvent. Such a coating is made preferably on a support. Conventional coating techniques can be used. The binder concentration in the solution can be between about 1% and about 50% by weight of the solvent.

Typically the solution is coated onto the support by such means as whirler coating, brushing, doctor-blade coating, hopper coating and the like, such as is described in Product Licensing Index, Vol. 92 December 1971, Publication No. 9232, at page 109. The amount of solids as coated should be between about 2 and about 20 g/m² of support. Multilayered elements can also be used.

The following examples are included by way of further illustration of the invention:

EXAMPLE 1

Poly(ethylene-co-1,4-cyclohexylenedimethylene-1-methyl-2,4-benzenedisulfonamide) made from approximately equal molar amounts of ethylenediamine and 1,4-cyclohexanebis(methylamine) was prepared as described above using Method B and coated in admixture with phthalaldehyde, 2-isopropoxy-1,4-naphthoquinone, and hexa-amine cobalt(III) trifluoroacetate from an acetone solution at 4 mil wet thickness on a poly-(ethylene terephthalalate) support, and dried. The sample was heated under the various conditions noted in Table I below and analyzed for phthalaldehyde retention by first calculating how much phthalaldehyde was in the initial coating per square decimeter, based on the known concentration in the dope, and then by analyzing the heated sample for phthalaldehyde remaining, using the following technique. The phthalaldehyde of the sample was reacted with trifluoroacetic anhydride and fluoranthene to form an orange dye, the density of which was measured colorimetrically using a Cary Model 15 Spectrophotometer at 477 nm and a 1.0 cm quartz cell.

The glass transition temperature (Tg) was ascertained by differential scanning calorimetry. The properties of the polymer were obtained by analysis of a portion of the polymer prior to admixture with phthalaldehyde.

Table I

| | Properties | | | | |
|---|---|---|---|---|---|
| | | | % Phthalaldehyde Loss | | |
| Example | Inherent Viscosity | $T_g$ | 2 min. 140° F | 5 min. 140° F | 15 min. 140° F |
| 1 | 0.84 | 147° C | nil | nil | nil |

Such a negligible phthalaldehyde loss is a marked improvement over many known binders.

EXAMPLES 2-7

The procedure described in Example 1 was repeated, except using the following reactants, to prepare examples containing the binders listed in Table II.

| polymer | 1.89g |
|---|---|
| acetone | 7.50 |
| phthalaldehyde | 0.32 |
| hexa-ammine cobalt(III) trifluoroacetate | 0.17 |
| 2-isopropoxy-1,4-naphthoquinone | 0.011 |
| surfactant | 0.08 |

The compositions were hand-coated at a 4-mil wet laydown on a subbed poly(ethylene terephthalate) support and dried. Subsequent heating on a coating block under the conditions specified in Table III. To more accurately calculate the amount of initial phthalaldehyde present, the amount of cobalt coverage was ascertained from X-ray fluorescence analysis, and the phthalaldehyde amount was then calculated using the known ratio of phthalaldehyde to cobalt. The polymers used were of the structure

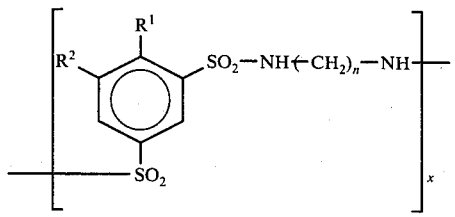

and

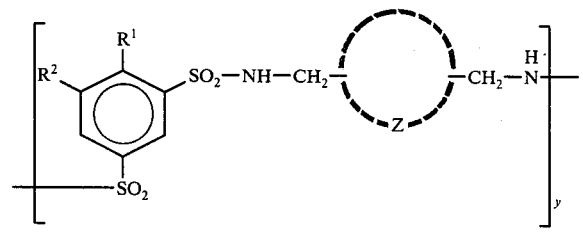

wherein the values of $R^1$, $R^2$, $n$, $Z$, $x$ and $y$ are as set forth in Table II.

Table II

| | Polymers Tested | | | | | |
|---|---|---|---|---|---|---|
| Example | $R^1$ | $R^2$ | n | Z | x | y |
| 2 | CH₃ | H | 2 | 1,4-cyclohexylene | 20 | 80 |
| 3 | CH₃ | H | 2 | 1,4-cyclohexylene | 40 | 60 |
| 4 | CH₃ | H | 2 | 1,4-cyclohexylene | 60 | 40 |
| 5 | CH₃ | H | 2 | 1,4-cyclohexylene | 80 | 20 |
| 6 | CH₃ | H | — | 1,4-cyclohexylene | 0 | 100 |
| 7 | CH₃ | H | — | 1,3-phenylene | 0 | 100 |

Table III

| | | | % Phthalaldehyde Loss After | |
|---|---|---|---|---|
| Example | Tg(° C) | Inherent Viscosity | 5 min, 150° F | 15 min, 150° F |
| 2 | 148 | 0.46 | 7 | 10 |
| 3 | 144 | 0.70 | 5 | 9 |
| 4 | 138 | 0.53 | 3 | 8 |
| 5 | 131 | 0.39 | 7 | 14 |
| 6 | 152 | 0.50 | 8 | 11 |
| 7 | 118 | 0.65 | 4 | 4 |

COMPARATIVE EXAMPLE

To demonstrate the unexpectedness of the performance of the copolymers of the invention, the procedure of Example 2 was repeated, except the polymer used was poly(propylene-1-methyl-2,4-benzenedisulfonamide), a control selected on the basis of a glass transition temperature and inherent viscosity, 123° C and 0.74 respectively, comparable to that of poly(ethylene-co-1,4-cyclohexylenedimethylene-1-methyl-2,4-benzenedisulfonamide), a currently preferred embodiment of the present invention. When the phthalaldehyde loss study was repeated on this control polymer, the results after 5 minutes were 20% loss and after 15 minutes, 27% loss. It was not expected that the difference between the percent loss for Example 2, for example, 7% at 5 minutes, would be so much improved over the loss for this control polymer for the same time period.

The invention has been described in detail with particular reference to certain preferred embodiments thereof, but it will be understood that variations and modifications can be effected within the spirit and scope of the invention.

What is claimed is:

1. A polymer comprising repeating units having the structures

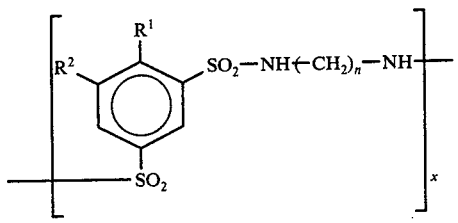

and

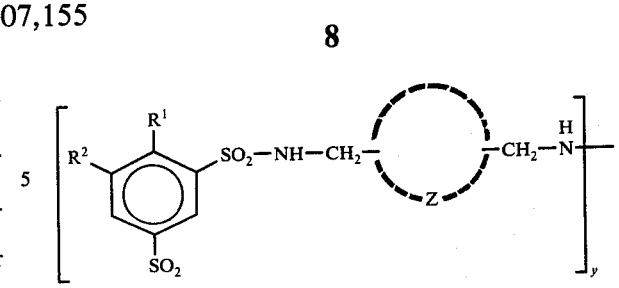

wherein
$R^1$ and $R^2$ are the same or different, and are each hydrogen, halogen or alkyl from 1 to 3 carbon atoms,
$n$ is 2 or 3,
$x$ and $y$ are mole percentage amounts of the respective repeating units
$x$ ranging from 0 to about 90% and $y$ being at least 10%, and
Z represents the atoms necessary to form a saturated or unsaturated carbocyclic ring having from 5 to 7 carbon ring atoms.

2. A polymer as defined in claim 1, wherein $R^1$ is methyl, $R^2$ is hydrogen, and Z is 6 carbon atoms forming a cyclohexylene ring.

3. Poly(ethylene-co-1,4-cyclohexylenedimethylene-1-methyl-2,4-benzenedisulfonamide).

4. Poly(ethylene-co-1,4-cyclohexylenedimethylene-1-chloro-2,4-benzenedisulfonamide).

5. Poly(ethylene-co-1,4-cyclohexylenedimethylene-1,2-dichloro-3,5-benzenedisulfonamide).

6. Poly(ethylene-co-1,4-cyclohexylenedimethylene-1-chloro-3,5-benzenedisulfonamide).

7. Poly(ethylene-co-1,3-xylylene-1-methyl-2,4-benzenedisulfonamide).

8. Poly(1,4-cyclohexylenedimethylene-1-methyl-2,4-benzenedisulfonamide).

9. Poly(1,3-xylylene-1-methyl-2,4-benzene-disulfonamide).

10. An organic solvent-soluble polymer, comprising
   (a) from about 0 to about 90 mole percent of the polycondensed monomers

* * * * *